United States Patent
Froitzheim (10) Patent No.: US 11,082,081 B2
(45) Date of Patent: Aug. 3, 2021

(54) DRIVER FOR QUASI-RESONANT COMMUNICATION WITH A MOBILE TRANSPONDER

(71) Applicant: Continental Automotive GmbH, Hannover (DE)

(72) Inventor: Herbert Froitzheim, Pettendorf (DE)

(73) Assignee: Continental Automotive GmbH, Hannover (DE)

(*) Notice: Subject to any disclaimer, the term of this patent is extended or adjusted under 35 U.S.C. 154(b) by 563 days.

(21) Appl. No.: 15/755,378

(22) PCT Filed: Jul. 27, 2016

(86) PCT No.: PCT/EP2016/067942
§ 371 (c)(1),
(2) Date: Feb. 26, 2018

(87) PCT Pub. No.: WO2017/032539
PCT Pub. Date: Mar. 2, 2017

(65) Prior Publication Data
US 2020/0235775 A1    Jul. 23, 2020

(30) Foreign Application Priority Data
Aug. 25, 2015    (DE) ............. 10 2015 216 220.6

(51) Int. Cl.
*H04B 1/38*    (2015.01)
*H04B 1/59*    (2006.01)
(Continued)

(52) U.S. Cl.
CPC .............. *H04B 1/59* (2013.01); *B60R 25/01* (2013.01); *B60R 25/24* (2013.01); *G06K 7/10366* (2013.01); *G06K 19/0723* (2013.01)

(58) Field of Classification Search
CPC .............. B60R 2325/205; B60R 25/24; B60R 2300/406; B60R 2325/101; B60R 25/01;
(Continued)

(56) References Cited

U.S. PATENT DOCUMENTS 4,630,044 A    12/1986    Polzer
5,838,074 A    11/1998    Loeffler et al.
(Continued)

FOREIGN PATENT DOCUMENTS

CN    1425223 A    6/2003
CN    101396266 A    4/2009
(Continued)

OTHER PUBLICATIONS

"RFID-Handbook"; Introduction to RFID; Written by Admin; Heute die Technologie von Morgen beherrschen; 2015; 7 pages; http://rfid-handbook.de/about-rfid.html?showall=1&limitstart=; Aug. 21, 2015.

(Continued)

Primary Examiner — Nhan T Le (57) ABSTRACT

The application relates to methods and a driver for communication with a transponder,
in particular a driver for installation in a motor vehicle and for communication with a mobile transponder for a vehicle access and/or start system of a motor vehicle, wherein the driver is designed so that, after a first transmission at a first transmission frequency and after driver-side reception of a response of a transponder at the transponder resonance frequency thereof, and after driver-side determination of the response frequency of the response using a frequency detection apparatus,
said response frequency is set, in particular by changing transmission pauses, at the driver as the second transmission frequency, corresponding to the measured transponder reso- (Continued)

nance frequency, at which the driver is then intended to transmit, wherein the driver has a resonant circuit (2, 3, 4), which has a higher driver resonant frequency than the mentioned first transmission frequency and than the mentioned second transmission frequency of the driver.

13 Claims, 6 Drawing Sheets (51) Int. Cl.
 *B60R 25/01* (2013.01)
 *B60R 25/24* (2013.01)
 *G06K 7/10* (2006.01)
 *G06K 19/07* (2006.01)
(58) Field of Classification Search
 CPC ... B60R 2325/20; B60R 25/209; H04B 1/082; H04B 10/50; H04B 1/59; G06K 19/0723; G06K 7/10366
 See application file for complete search history.

(56) References Cited

U.S. PATENT DOCUMENTS

| | | | | |
|---|---|---|---|---|
| 6,323,566 B1* | 11/2001 | Meier | ................ | G07C 9/00309 307/10.2 |
| 2005/0270222 A1 | 12/2005 | Vavik | | |
| 2007/0265690 A1 | 11/2007 | Lichtenstein et al. | | |
| 2009/0224888 A1 | 9/2009 | Caruana | | |
| 2016/0250995 A1 | 9/2016 | Froitzheim et al. | | |
| 2017/0327086 A1* | 11/2017 | Katou | ................ | G08C 17/02 |

FOREIGN PATENT DOCUMENTS

| | | |
|---|---|---|
| CN | 101542499 A | 9/2009 |
| DE | 19546171 C1 | 11/1996 |
| DE | 102013220596 A1 | 4/2015 |
| EP | 0537378 A1 | 4/1993 |
| EP | 0841448 A1 | 5/1998 |
| IE | 102008031534 A1 | 1/2010 |
| WO | 2015/052033 A1 | 4/2015 |

OTHER PUBLICATIONS

International Search Report and Written Opinion dated Oct. 20, 2016 from corresponding International Patent Application No. PCT/EP2016/067942.
Office Action dated Apr. 21, 2016 for corresponding German Patent Application No. 10 2015 216 220.6.
Office Action dated Aug. 4, 2016 for corresponding German Patent Application No. 10 2015 216 220.6.

* cited by examiner

Fig. 6

DRIVER FOR QUASI-RESONANT COMMUNICATION WITH A MOBILE TRANSPONDER

The invention relates to methods and apparatuses for communication between a driver, in particular on the part of a motor vehicle, and a transponder.

Communication between a driver on the part of a motor vehicle and a transponder, for example for a PASE (Passive Start and Entry) system and/or RKE (Remote Keyless Entry) system is known, for example, from DE102008031534A1.

Drivers on the part of a motor vehicle and transponders can operate, for example, in accordance with the RFID system that is known per se, for example in accordance with http://rfid-hand-book.de/about-rfid.html?showall=1&limitstart=

Accurate adjustment of the transmission frequency of a primary-side driver to the actual resonant frequency of a transponder is known from DE19546171C1, wherein primary-side transmission at a (presumed) nominal frequency of the transponder is carried out, then the transponder inherent resonant frequency in the response of the transponder is measured on the primary side when the primary-side transmitter is switched off, and then said measured transponder inherent resonant frequency is used as the new primary-side transmission frequency for further transmission of the primary side.

It is an object of the invention to optimize communication between a driver and a transponder. The object is achieved in each case by the subject matter of the independent patent claims.

Some particularly advantageous refinements of the invention are specified in the subclaims and the description.

Refinements of the invention can efficiently optimize communication between a driver and a transponder by specific adjustment to the inherent frequencies of both the transponder and the driver with high flexibility.

Further features and advantages of some advantageous refinements of the invention will emerge from the description that follows of exemplary embodiments of the invention with reference to the drawing, in which, to illustrate some possible refinements of the invention.

Figure 1:
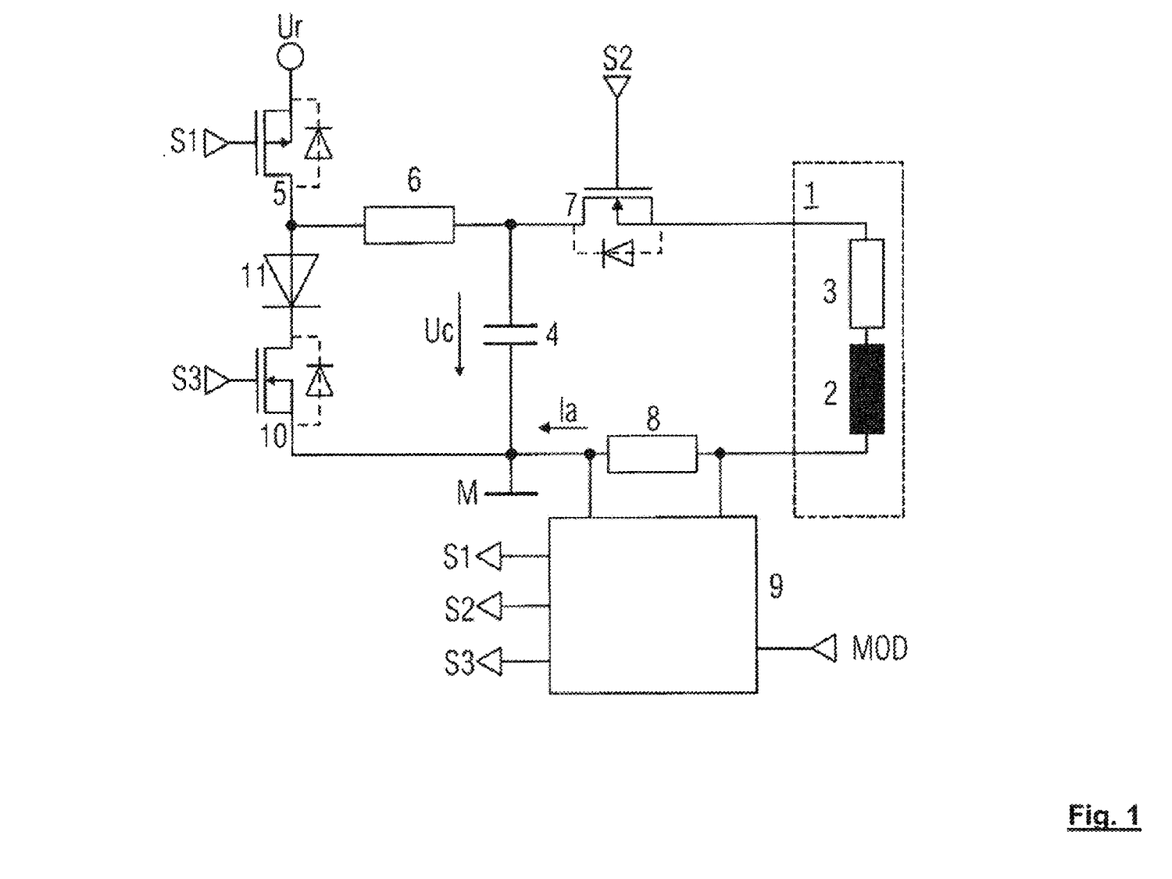
FIG. 1 shows a simplified schematic depiction of a driver for quasi-stationary charging at a driver resonant-circuit resonant frequency above the driver transmission frequency as in DE102013220596A1.

FIG. 1 shows a driver in some refinements of the invention, such as to some extent those in DE102013220596A1, the content of which is incorporated in this application by reference.

FIG. 1 shows a quasi-resonant driver, without, however, pause adjustment and/or charging of a transponder thereby, the resonant circuit of said quasi-resonant driver having a higher resonant frequency than the driver carrier frequency (at which the driver including the pauses transmits), wherein in this case, however, according to refinements of the invention:

one or more pauses (T4 to T6; T8 to T10) can be inserted, omitted, extended or shortened before and/or after one or more oscillations at the driver resonant frequency fResTrb and/or the driver resonant-circuit resonant frequency fResTrb can be changed by changing, for example, a capacitance 4 of the resonant circuit (2, 3, 4), and wherein adjusted pauses (T4 to T6; T8 to T10) and/or a changed capacitance 4 can also be used, for example, to charge the capacitor 4, and wherein the quasi-resonance can have the advantage that much of the expended energy is radiated, for example due to fewer harmonics (oscillations).

Figure 2:
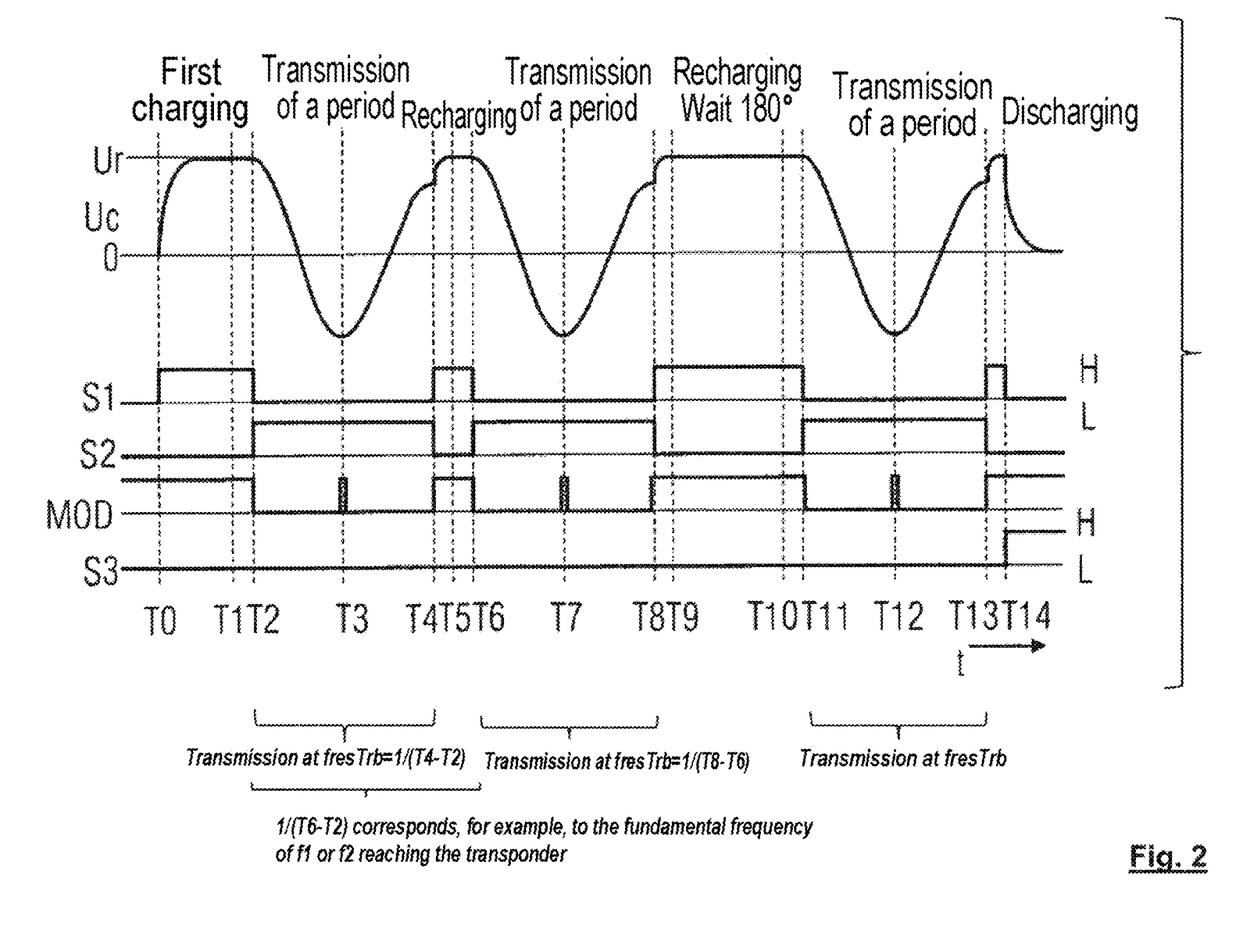
FIG. 2 shows a simplified schematic depiction of a time profile during transmission using a driver at a driver resonant-circuit resonant frequency above a driver transmission frequency as in DE102013220596A1, but here with pauses between times of the transmission at the driver resonant-circuit resonant frequency, said pauses being set according to the frequency of a transponder response.

FIG. 2 shows a time profile during transmission SR1, SR5 using a driver Trb at a driver resonant-circuit resonant frequency f-Trb-Res greater than (that is to say above) the driver transmission frequency f1 or f2, as in DE102013220596A1, but in this case, as an inventive refinement of a driver Trb with pauses (T4 to T6; T8 to T10) between, for example, periods (T2 to T4; T6 to T8; T11 to T13) of the transmission at the driver resonant-circuit resonant frequency f-Trb-Res, said pauses being set according to the frequency f-res-Transp of a received transponder response AW, (for example during SR1 or SR5 in FIG. 5) and/or with a changed capacitance 4 of the resonant circuit (2, 3, 4).

Figure 4:
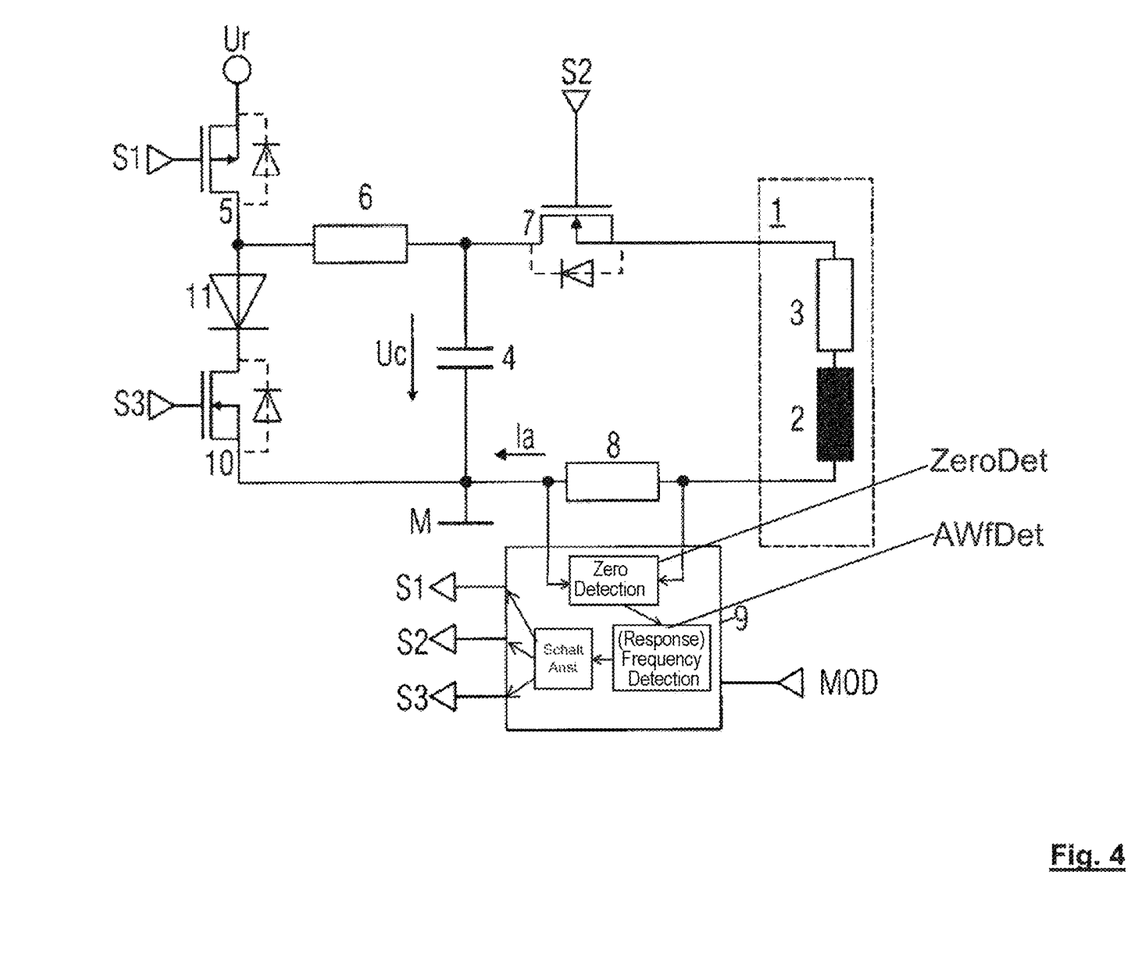
FIG. 4 shows a simplified schematic depiction of a driver, for example for quasi-stationary charging at a driver resonant-circuit resonant frequency above the transmission frequency of the driver and adjustment of the transmission frequency of the driver to the transponder resonant frequency of a, for example inductive, response of the transponder by adjusting pauses to the detected transponder response frequency.

FIG. 4 shows an inventive refinement of a driver Trb. According to inventive refinements, a driver Trb (for example as a modification to that in DE102013220596A1) can thus be designed in such a way that there is provision (for example as in FIG. 4) for adjustment of the length and/or number of one or more pauses (T4 to T6; =times without transmission at the driver resonant-circuit resonant frequency f-Trb-Res), and/or there is provision for adjustment of the frequency f2 (below the driver resonant frequency (fResTrb)) of the carrier resonant circuit, for example by a varying capacitance 4 of the carrier resonant circuit (2, 3, 4) (illustrated, for example, in FIG. 4), whereby (in each case individually, or combined) the second transmission frequency f2 at which the driver Trb transmits after a response AW of the transponder Transp is adjusted to the frequency (=transponder resonant frequency fResTransp) of a response AW, received by the driver Trb, of a transponder Transp to a request Anf (at a first transmission frequency f1 amounting to a presumed/known/conventional (target) resonant frequency of the transponder) of the driver Trb.

As FIG. 4 indicates, for example, the driver Trb can have a frequency detection apparatus AWfDet (in particular in the controller 9), which can be used to determine the frequency fResTransp of the (fundamental oscillation of the) response AW of a transponder Transp received by the driver Trb, for example from zero crossings of the current Ia through an inductance 2 of a resonant circuit (2, 3, 4) of the driver Trb that are detected using a zero crossing detector Zero-Det (in particular provided in the controller 9),
wherein, during the measurement (ZeroDet, AWfDet) of the frequency fResTransp of the (fundamental oscillation of a) response AW of a transponder Transp, for example, a charging circuit of the resonant circuit (2, 3, 4) of the driver Trb can be switched off (in FIG. 4 using the element with reference numerals 5, 10) and the resonant circuit (2, 3, 4) of the driver Trb can be activated (in FIG. 4 using the element with the reference numeral 7).

On account of a frequency fResTransp of the (fundamental oscillation of the) response AW, received by the driver Trb, of a transponder Transp determined by the one frequency detection apparatus AWfDet, a switching element actuation Schalt-Anst can, for example, define how said switching element actuation actuates the switching elements in the driver Trb using signals S1, S2, S3 in such a way that the duration and/or number of pauses (T4 to T6; T8 to T10) between transmission at the driver resonant frequency fResTrb are adjusted in such a way that the driver Trb transmits at the frequency (in particular the fundamental frequency) f2 according to the transponder response frequency fResTransp.

When the driver Trb or the resonant circuit (2, 3, 4) thereof is operated at a frequency f1 or f2 of the carrier resonant circuit below the driver resonant frequency (fResTrb), the request Anf emitted by the carrier resonant circuit (2, 3, 4) and/or the transmission transmitted after adjustment of the frequency to the frequency f2 can in this case have a fundamental oscillation and harmonics, wherein the frequency f1 or f2 of the fundamental oscillation can in each case be lower than the driver resonant frequency fResTrb of the carrier resonant circuit (2, 3, 4), which may nevertheless be expedient in terms of harmonics and losses and, moreover, can be adapted in a very flexible, expedient and accurate manner to resonant frequencies of different transponders.

Figure 3:
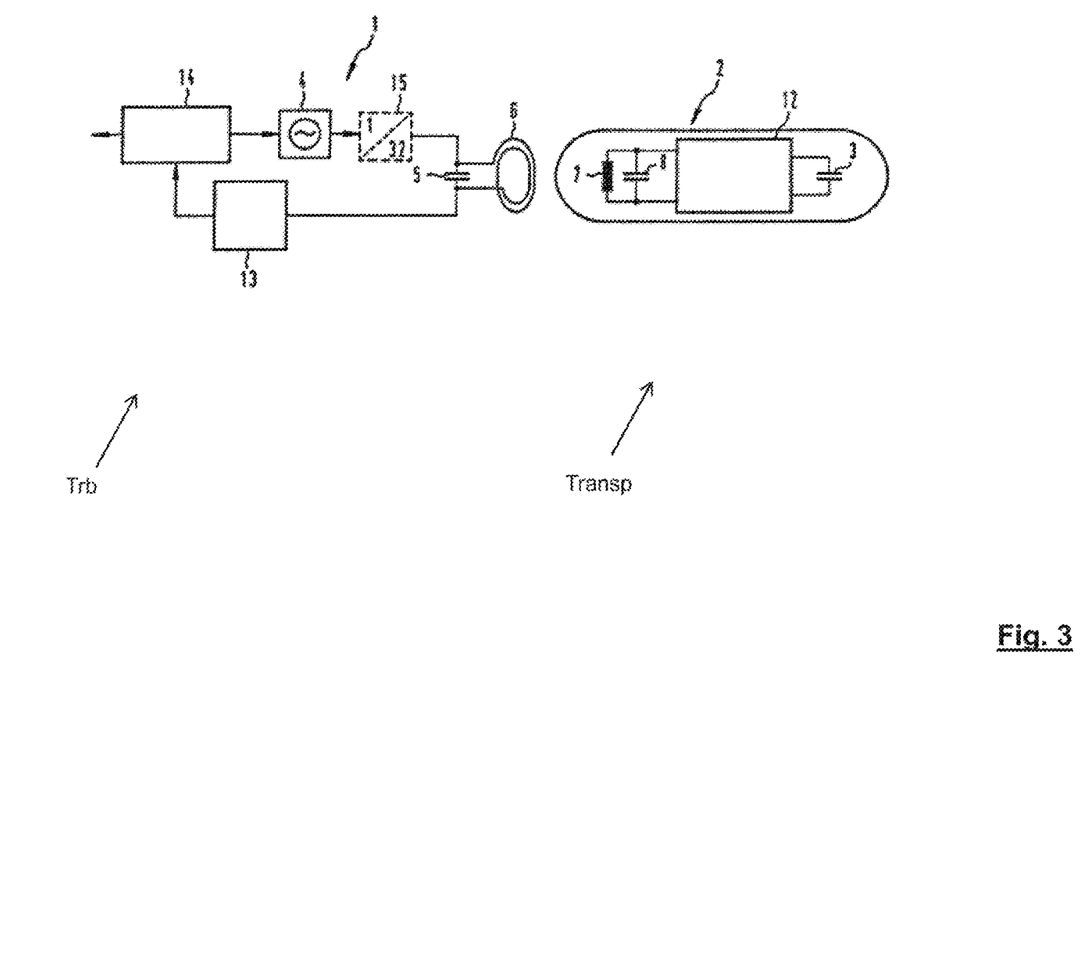
FIG. 3 shows a simplified schematic depiction of a driver and a transponder with adjustment of the transmission frequency of the driver to the resonant frequency of the driver as in DE19546171C1.

Inventive refinements of a driver Trb and/or of a method can function using different transponders Transp, for example also using the transponder from DE19546171C1 shown on the right in FIG. 3.

Figure 5:
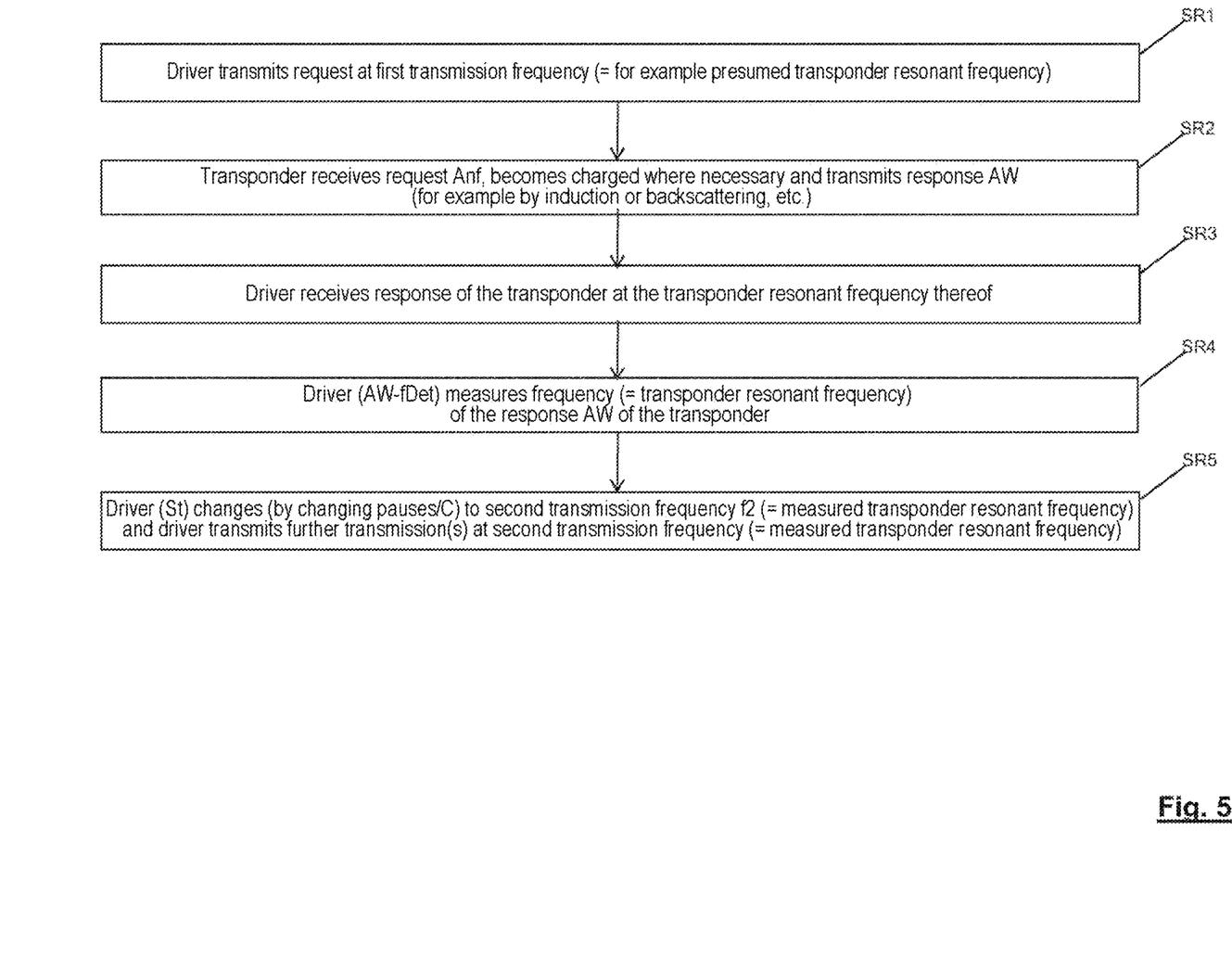
FIG. 5 shows a simplified schematic depiction of a flow chart of a communication at a driver resonant-circuit resonant frequency above the transmission frequency of the driver and adjustment of the transmission frequency of the driver to the resonant frequency of a response of the transponder.

FIG. 5 illustrates possible procedures in some refinements of the invention as a flow chart:
In step SR1, a driver Trb transmits (for example cyclically) a request Anf at a first transmission frequency f1 (=for example at the approximately presumed transponder resonant frequency of the transponder Transp).
In step SR2, the transponder Transp receives a request Anf (of a driver Trb), becomes charged where necessary and transmits a response AW (for example by induction or backscattering, etc.).
In step SR3, the driver Trb receives a response AW of the transponder Transp (at the transponder resonant frequency fResTransp thereof).
In step SR4, the driver Trb determines (for example using AW-fDet, ZeroDet) the frequency (=transponder resonant frequency) of the response AW, received by the driver, of the transponder Transp.

The driver Trb (that is to say, for example, the controller 9, AWfDet, SchaltAnst thereof) changes its transmission frequency to a second transmission frequency f2 (=that is to say the measured transponder resonant frequency), for example by changing pause number/pause lengths (according to step SR5 in FIG. 5), and the driver Trb transmits one or more further transmission(s) to the transponder Transp at said second transmission frequency f2 (which then corresponds to the measured transponder resonant frequency).

For example, the driver Trb measures (for example using AWfDet, ZeroDet) the frequency (=transponder resonant frequency) fResTransp of the response AW, received by the driver, of the transponder Transp, which frequency fResTransp is lower, for example, than the frequency f1 of the request AW,
and in each case changes the start T4 and/or end T6 of a pause (between times of transmission at fResTrb) by means of the circuit actuation SchaltAnst of the controller 9, with the result that the pause becomes longer and namely with the result that the frequency f2 (on account of fResTrb and pause) at which the driver transmits is now as low as the frequency (=transponder resonant frequency) fResTransp of the response AW, received by the driver, of the transponder Transp.

Or, for example, the driver Trb measures (for example using AW-fDet, Zero-Det) the frequency (=transponder resonant frequency) fResTransp of the response AW, received by the driver, of the transponder Transp, which frequency fResTransp is, for example, greater than the frequency f1 of the request AW, and in each case changes the start T4 and/or end T6 of a pause (between times of transmission at fResTrb) by means of the circuit actuation SchaltAnst of the controller 9, with the result that the pause becomes shorter and namely with the result that the frequency f2 (on account of fResTrb and pause) at which the driver transmits is now as great as the frequency (=transponder resonant frequency) fResTransp of the response AW, received by the driver, of the transponder Transp.

Expressed otherwise and simply, refinements of the invention can make provision for
the ("primary-side") driver resonant circuit (2, 3, 4) to transmit (temporarily) at its inherent resonance, whereby it requires a particularly low amount of energy, and, for example, does not (intermediately temporarily) transmit (and where necessary recharge) in the pauses, with the result that then the correct period and hence transmission frequency (in particular amounting to approximately the transponder resonant frequency thereof) reach the transponder Transp on account of the pause(s), for example:

period=(period of driver-side resonance)+(pause)

In this case, for example, the transponder nominal resonant frequency (=1/period) is therefore selected initially (during first transmission, that is to say transmission of a request Anf) in the driver Trb by pauses adjusted to said frequency (before measurement).
The transponder resonant frequency (of a response AW) is then measured in the driver and the pause period of one of more new pauses is selected for further transmission of the driver after the measurement, such that transponder resonant frequency=1/period (where: period=(period of driver-side resonance)+(new pause period)).

Figure 6:
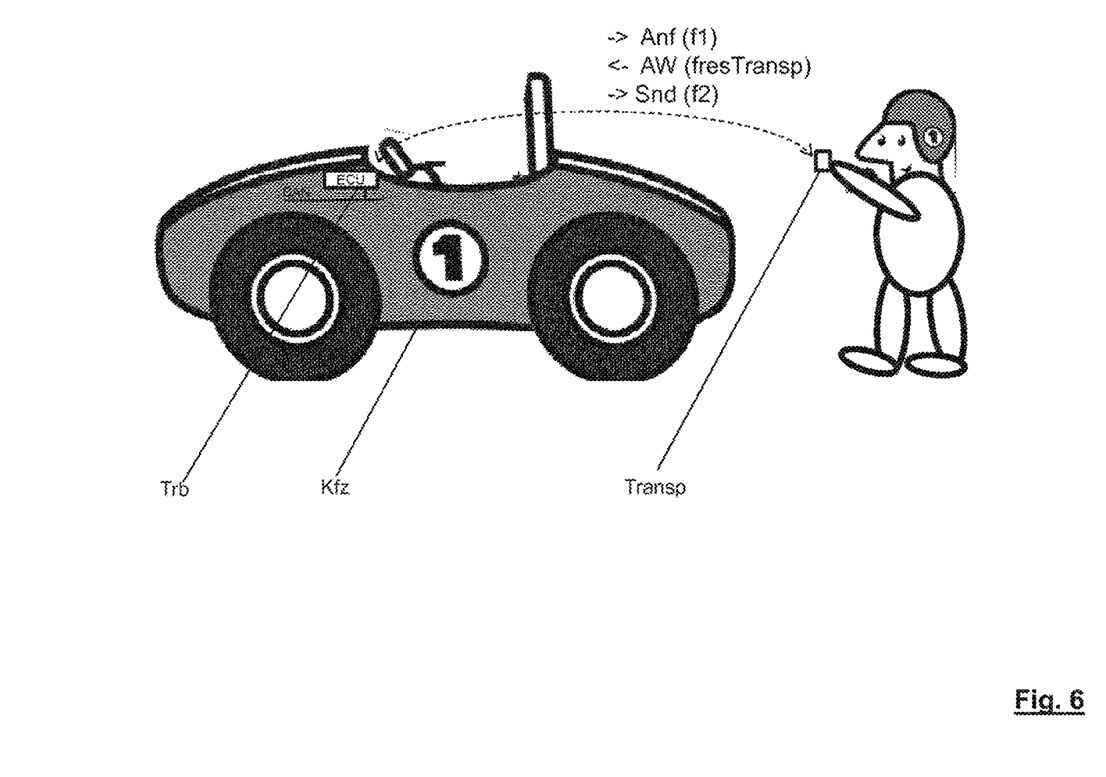
FIG. 6 shows a simplified schematic depiction of a vehicle having a driver and a mobile transponder, in particular for a vehicle access and/or start system.

As FIG. 6 shows, refinements can be used, in particular, in a vehicle having a driver for communication with a mobile transponder, in particular for a vehicle access and/or start system, such as PASE or RKE, for example.

The request Anf and/or one or more further transmission(s) of the driver Trb to the transponder Transp and/or the response AW and/or further responses of the transponder Transp can serve, for example, for authentication (for example using challenge response methods or jointly known tables etc.) of the transponder Transp in the driver Trb (and/or vice versa), and/or for a motor vehicle access and/or start system, such as PASE (="Passive Start and Entry") and/or RKE ("Remote Keyless Entry"), for example.

The invention claimed is:

1. A driver for communication with a transponder, for a vehicle at least one of access and start system, the driver comprising:
a resonant circuit;
a frequency detection apparatus;
wherein after a first transmission at a first transmission frequency and after driver-side reception of a response of a transponder, and after driver-side determination of response frequency of the response using the frequency detection apparatus, said response frequency being set at the driver as a second transmission frequency at which the driver is then intended to transmit;
wherein the resonant circuit has a higher driver resonant frequency than the first transmission frequency and the second transmission frequency; and
a controller configured to change pauses between transmissions at the driver resonant frequency, and thus generating the second transmission frequency upon a second transmission of the driver;
the driver configured to change its transmission frequency from the first transmission frequency to the second transmission frequency, the response frequency being set at the driver as the second transmission frequency at which the driver is intended to transmit, the controller generating a pause at least one of before and after respectively a transmission at the driver resonant frequency;
wherein the one or more pauses is selected for transmission at the second transmission frequency in a different at least one of length and number than for transmission at the first transmission frequency.

2. The driver as claimed in claim 1,
further configured to set at the driver the response frequency as the second transmission frequency at which the driver is intended to transmit;
the controller changing the driver resonant frequency by changing capacitance of a resonant circuit of the driver.

3. The driver as claimed in claim 1,
wherein the driver has an, in particular quasi-resonant, resonant circuit, which has a five to twenty percent higher resonant frequency than the first transmission frequency and also than the second transmission frequency of the transponder.

4. The driver as claimed in claim 1,
wherein at least one of the driver and the controller thereof is configured to charge a capacitance of a resonant circuit of the driver during inserted pauses between the transmissions, in particular per period, at the higher resonant frequency.

5. The driver as claimed in claim 1, wherein at least one of the driver and the controller thereof is configured to isolate an antenna of a resonant circuit from a capacitance of a resonant circuit of the driver during inserted pauses between the transmission, in particular of one or more periods, at the higher resonant frequency.

6. The driver as claimed in claim 1,
wherein at least one of the driver and the controller thereof is configured at least one of not to transmit and to transmit at a different frequency to the resonant frequency of the driver during inserted pauses between the transmission, of one or more periods, at the higher resonant frequency of the driver.

7. The driver as claimed in claim 1 further comprising:
a controller for changing pauses between the transmission at the higher resonant frequency;
wherein changing of pauses comprises at least one of extending and shortening of pauses and increasing and reducing the number of pauses.

8. The driver as claimed in claim 1,
wherein the frequency detection apparatus is comprised in the controller, the frequency detection apparatus being configured to determine the response frequency as a frequency of a fundamental oscillation of the response of a transponder.

9. The driver as claimed in claim 1,
wherein the transponder comprises a "quasi-resonant" resonant circuit, the resonant circuit having a higher resonant frequency than the first transmission frequency and the second transmission frequency of the transponder; and
the transponder comprises a controller for changing pauses between the transmission at the higher resonant frequency and thus generating at least one of respectively the first transmission frequency and second transmission frequency as a transmitted fundamental frequency upon at least one of the first transmission and the second transmission.

10. The driver as claimed in claim 1,
wherein at least one of the driver and the controller thereof has a zero crossing detection system for determining a zero crossing of antenna current in an antenna of a resonant circuit of the driver, and thus determine time of at least one of beginning and end of at least one pause between the transmission at the driver resonant frequency.

11. The driver as claimed in claim 1,
wherein at least one of the driver and the controller thereof has a zero crossing detection system configured to determine a zero crossing of antenna current in an antenna of a resonant circuit of the driver, and thus determine time of at least one of beginning and end of at least one oscillation of the response signal and to determine therefrom transponder resonant frequency.

12. The driver as claimed in claim 1,
wherein at least one of a request and one or more further transmission of the driver to the transponder and the response and further responses of the transponder are configured to at least one of authenticate the transponder in the driver and vice versa, and for a motor vehicle access and start system.

13. A method for communication of a driver with a transponder for installation in a motor vehicle having a mobile transponder, comprising:
after a transmission of a request at a first transmission frequency by the driver and after driver-side reception of a response of a transponder at a response frequency determining said response frequency is at the driver, and setting said response frequency at the driver as a second transmission frequency at which the driver then transmits, wherein a resonant circuit has a higher driver resonant frequency than the first transmission frequency and the second transmission frequency;

changing pauses between transmissions at the driver resonant frequency, and thus generating the second transmission frequency upon a second transmission of the driver;

changing transmission frequency of the driver from the first transmission frequency to the second transmission frequency, the response frequency being set at the driver as the second transmission frequency at which the driver is intended to transmit;

generating one or more pauses without transmission at the resonant frequency of the resonant circuit of the driver at least one of before and after a transmission at the resonant frequency of a resonant circuit of the driver; and selecting the one or more pauses for transmission at the second transmission frequency in a different at least one of length and number than for transmission at the first transmission frequency.

\* \* \* \* \*